No. 632,564. Patented Sept. 5, 1899.
P. R. GULDEN.
SEAT OR SADDLE SUPPORT IN CYCLES.
(Application filed Apr. 28, 1898.)

(No Model.)

Witnesses.
Thomas G. Clark.
Ernest G. Taylor.

Inventor:
Paul Richard Gulden,
Per G. J. M. Hardingham.
Attorney.

UNITED STATES PATENT OFFICE.

PAUL RICHARD GULDEN, OF LEIPSIC, GERMANY.

SEAT OR SADDLE SUPPORT IN CYCLES.

SPECIFICATION forming part of Letters Patent No. 632,564, dated September 5, 1899.

Application filed April 28, 1898. Serial No. 679,112. (No model.)

*To all whom it may concern:*

Be it known that I, PAUL RICHARD GULDEN, a subject of the King of Saxony, and a resident of Leipsic, in the Kingdom of Saxony and German Empire, have invented a certain new and useful Improvement in Seat or Saddle Supports in Cycles, of which the following is a specification.

This invention relates to improvements in seat or saddle supports in cycles, (bicycles, tricycles, and the like;) and its object is to provide improved means for so mounting the seats or saddles in cycle-frames as to allow the same to freely follow or yield to the movements of the rider, to thereby neutralize the effects of friction and shocks, and thus to render the exercise of riding more convenient and less fatiguing for the rider.

Bicycle seats or saddles have heretofore in some cases been constructed with relatively movable resilient or elastic parts and in other cases they have been so mounted in the cycle-frames as to be suspended and to swing thereon. Cycle saddles or seats of this class do not, however, appear to have been adopted to any great extent, and as regards the suspended swinging saddles they present several objections. They cannot be applied to all bicycles, but only to such as have been specially constructed or arranged for the purpose, and, on the other hand, they present this objection, that they do not afford a sufficient counter-support for the rider when he wants to put extra pressure onto the pedals, as in racing or riding uphill. According to my present invention I avoid these objections by providing improved means whereby the seat or saddle may be so mounted on a cycle as to be freely movable thereon both longitudinally and laterally on its axis, but wherein the extent of such movements, and more especially the extent of its rearward movement, is confined within certain fixed limits, so that the rider no matter what pressure he applies in pedaling will have a fixed counter-support.

My invention therefore consists in a seat or saddle support for cycles having a movable part constructed and arranged as hereinafter more fully described and shown in the accompanying drawings, the said seat or saddle support possessing the additional advantage that it may be readily applied to any of the usual cycles and that cycle seats or saddles of the usual kinds may be attached thereto.

Figure 1:
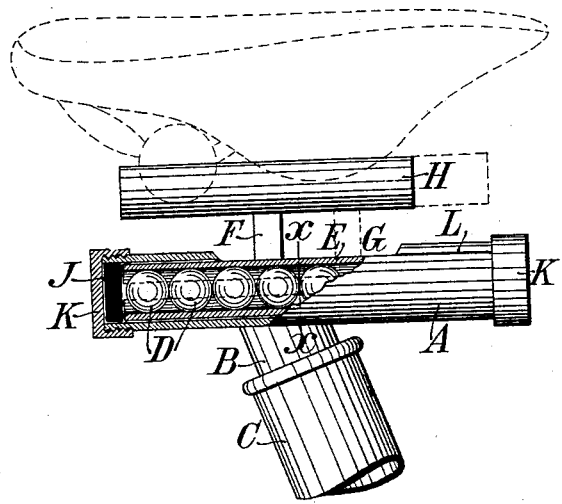
Figure 2:
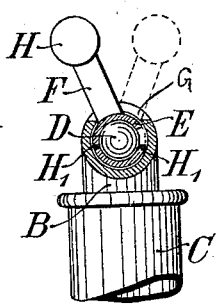
Figure 3:
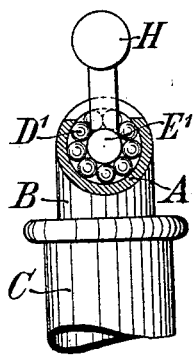

In the accompanying drawings, illustrating my invention, by way of example, Figure 1 is a side elevation, partly in vertical longitudinal section, of my improved seat or saddle support, the same being here shown as mounted in the respective tubular portion of a bicycle or other frame and its attached saddle being indicated by dotted lines. Fig. 2 is a corresponding vertical transverse section on the line $x\ x$ of Fig. 1. Fig. 3 is a similar section of a modification to be referred to.

The improved seat or saddle support, as shown in Figs. 1 and 2, consists, essentially, of a tubular casing A, provided with the usual shank B for insertion into the tubular frame portion C of a bicycle, tricycle, or other similar vehicle, and of a slide E, supported within the said casing A on antifriction-balls D, so as to be capable of both a longitudinal sliding movement and of a lateral rocking movement to the right and left within the said casing. An arm F, provided on top of the said slide E, extends upward through a longitudinal guide-slot G of the casing A and carries at its upper end a bar H, to which the seat or saddle may be attached in the usual and well-known manner. The curvature of the upper surface of the slide E preferably corresponds with that of the adjoining inner portion of the casing A, while the curvature of its lower surface conforms to the outer curvature of the supporting antifriction-balls D. This arrangement allows free movement of the slide E, and hence of the attached seat or saddle, both toward the front and rear, as well as to the right and left, as indicated in the drawings, the amount of friction being at the same time reduced to a minimum. The extent of the lateral rocking movement is limited, on the one hand, by the engagement of the arm F with the respective sides of the guide-slot G and, on the other hand, by the engagement of the edges of the slide E with the shoulders H', provided within the casing A, as shown, whereas the forward and rearward movement of the said slide is limited by the respective closed ends of the casing A. Within the latter cushions or pads J, of india-rubber or other suitable material, may be provided for the ends of the slide E to act against, the said cushions or pads being preferably held in place by threaded caps K, screwed on to the respective threaded end portions of the casing, the said caps thus closing the ends of the casing. It is obvious that for closing the ends of the casing I may also employ screw-threaded plugs entering corresponding threaded openings in the respective casing ends, or that other suitable means may be employed for the purpose.

In order to provide for removing the slide E from within the casing A, the one upper end portion of the latter adjoining the respective end of the guide-slot G may be formed as a separate movable part adapted to slide in suitable guides, as shown at L in Fig. 1, and to be partly or entirely withdrawn. I may also surround this end portion of the casing with suitable rings to assist in normally holding the said movable part in place.

In the modified construction shown in transverse section in Fig. 3 the body portion E' of the slide within the casing A is made round in transverse section and is entirely surrounded by antifriction-balls D'.

It is obvious that the shank B instead of being connected with the casing A at or near the longitudinal center thereof, as shown, may be attached at or near one of the ends of the casing, so as to thereby give the entire seat or saddle support an L shape instead of the T shape shown. I also wish it understood that it would not be a departure from this invention to substitute antifriction-rollers for the antifriction-balls shown.

Having now described my invention, what I claim as new, and desire to secure by Letters Patent, is—

1. In a cycle seat or saddle support having a tubular casing formed on the saddle-post, a sliding and rocking body mounted in the casing and supported by antifriction-bodies an arm on said sliding and rocking body extending through a slot in the upper side of said casing and being adapted for the reception of the saddle in the ordinary manner, substantially as herein described.

2. In a cycle seat or saddle support, the combination, with a tubular casing A having an upper guide-slot G and a shank B, of a sliding and rocking body E supported within said casing by antifriction-bodies D, an arm F on said sliding body projecting through said guide-slot and having the usual extension H for the attachment of the seat or saddle, and stops J and H' for limiting the axial and rocking movement respectively of the sliding body, substantially as set forth.

In witness whereof I have hereunto set my hand in presence of two witnesses.

PAUL RICHARD GULDEN.

Witnesses:
RICHARD MORITZ BERING,
JEAN GRUND.